United States Patent [19]
Riley et al.

[11] Patent Number: 6,141,651
[45] Date of Patent: Oct. 31, 2000

[54] FUNDING AND SETTLEMENT INTEGRATED SUSPENSE PROCESSING SYSTEM

[75] Inventors: James F. Riley, Frederick; John A. Sudec, Hagerstown, both of Md.; Michael Todd Roland, Chambersburg, Pa.; Scott B. Huffman; Paul A. Mettille, both of Hagerstown, Md.

[73] Assignee: First Data Corporation, Hackensack, N.J.

[21] Appl. No.: 09/100,425

[22] Filed: Jun. 19, 1998

[51] Int. Cl.[7] ....................................... G06F 17/60
[52] U.S. Cl. .................. 705/35; 705/30; 705/38; 705/39
[58] Field of Search .................. 705/35, 38, 39, 705/40, 30, 42

[56] References Cited

U.S. PATENT DOCUMENTS

| | | | |
|---|---|---|---|
| 5,699,528 | 12/1997 | Hogan | 705/40 |
| 5,787,403 | 7/1998 | Randle | 705/35 |
| 5,842,851 | 11/1998 | Chancey et al. | 705/40 |
| 5,848,400 | 12/1998 | Chang | 705/35 |
| 5,884,288 | 3/1999 | Chang et al. | 705/40 |
| 5,913,202 | 6/1999 | Motoyama | 705/35 |
| 5,920,848 | 7/1999 | Schutzer et al. | 705/42 |
| 5,930,778 | 7/1999 | Geer | 705/35 |
| 5,933,816 | 8/1999 | Zeanah et al. | 705/35 |
| 5,940,809 | 8/1999 | Musmanno et al. | 705/35 |
| 5,943,656 | 8/1999 | Crooks et al. | 705/35 |
| 5,963,926 | 10/1999 | Kumomura | 705/35 |
| 5,966,695 | 10/1999 | Melchione et al. | 705/35 |
| 5,966,699 | 10/1999 | Zandi | 705/38 |
| 5,974,146 | 10/1999 | Randle et al. | 705/40 |
| 5,978,780 | 11/1999 | Watson | 705/40 |

OTHER PUBLICATIONS

BANC One Corp., "New Credit Card Processing System Unveiled", Bank Marketing, vol. 25, Issue 9, p. 71, Sep. 1993.

Siegel, Carol A., "Electronic Commerce for Financial Institutions", Information Systems Security, vol. 6, Issue 1, p. 31, 14 pages, Spring 1997.

Bloom, Jennifer Kingso, "Wachovia Card Unit Upgrades Mainframe Processing", American Banker, vol. 162, Issue 148, p. 21, Aug. 4, 1997.

Keenan, Charles, "NOVA's $1.3B Deal for PMT to Create Top Card Processor for Small Retailers", American Banker, vol. 163, Issue 116, Jun. 19, 1998.

"Household Picks CCS", Card News, vol. 10, No. 18, Dialog File 636:Newsletter DB, Sep. 18, 1995.

"Acquiring Pacesetter (First Data id sending to its bank alliance partners the 300,000 accounts it obtained when it purchased 2 merchant acquires)", Credit Card Management, vol. 9, No. 5, p. 40, Dialog File 9:Business & Industry, Aug. 1996.

"IBM: Time is now for Electronic Commerce", M2 Presswire, Dialog File 636:Newsletter DB, Sep. 9, 1996.

*Primary Examiner*—Emanuel Todd Voeltz
*Assistant Examiner*—John W. Hayes
*Attorney, Agent, or Firm*—Brooks & Kushman PC

[57] ABSTRACT

A method of reporting suspense transaction detail to acquiring banks includes compiling financial transaction information to a database. The information in the database is then routed to a server operable with the World Wide Web. The financial transaction information from the server is then accessed at a client station operable with the World Wide Web.

1 Claim, 34 Drawing Sheets

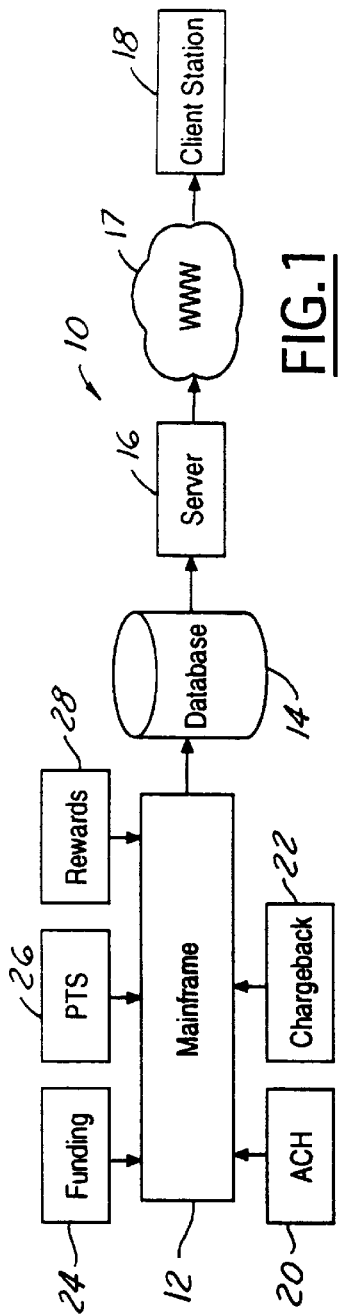

FIG. 2

| ACH REJECTS | | | | |
|---|---|---|---|---|
| File Edit Reports Help | | | | |
| BANK_BOSTON ▼ | | | | |
| | Merchant Name | | Merchant Number | Records |
| | X ELAINE ANTIQUES | | 233202210990 | 1 |
| | X INSTRUMENT TECH INC. | | 233202741994 | 2 |
| | X JAG LANDSCAPING | | 233201977995 | 1 |
| | X OX BOW MARINA INC. | | 233201533996 | 1 |
| | X PAPA MIAS ITALIAN BUFF | | 234510065993 | 1 |
| | X RAINBOW GLASS | | 233201047997 | 1 |
| | X ROSEMARY CASEY INTERIO | | 233204131996 | 1 |
| | X SAFARI HANDICRAFTS* | | 233202800998 | 1 |
| | X SAMUEL ROBER... | | 233200635990 | 3 |
| | X THE BELFRY INNE & BIST | | 233203869992 | 1 |
| | X THE CHILDRENS WORKSHO | | 233203521999 | 1 |
| | X THIMBLE ISLANDS WINE & L | | 234540065997 | 7 |
| Process Reject Input Transactions | | | | TROLAND |

MISC Form

| Bank Name: | BANK_BOSTON | Bank Code: | 1000 | | Date: | 05/12/1998 |

Memorandum To: FINANCIAL SERVICES

From: Todd Roland    Phone Ext: 30176

Re: REQUEST FOR FUNDING TRANSACTION

Please Note: This is a Misc. Form. If you are crediting / debiting a merchant, it will not be held until settlement Credit Merchant For: $ 99.00    Work of Day: 11/12/97

Merchant Number: 233202210    Merchant Name: ELAINES ANTIQUES

Original Amount: $ 4615.00    Credit G/L Acct. # Revenue:

Sequence Code: D55    This field must be completed Or The Misc. Form Will Be Returned To The Originating Area.

Please Use sequence code "only" for description when possible (Reminder: This sequence code description will show first on the merchants' statement, followed by the Free Form description)

Reason For Request: 11/08/97    Initiating Dept: ACH

Print Name:    Phone Ext:

[Print]  [Cancel]

FIG. 5

Please wait, updating merchantTransactions

FIG. 6

Check Request

Memorandum To : ACH Rejects  
From : Todd Roland  Date :  
Re : REQUEST FOR FUNDING TRANSACTION Print    Backup    Cancel

PLEASE PROVIDE REQUIRED INFORMATION FOR TRANSACTION

Old Check # :        New Check # :            Reason For Request : ACH Reject
Amount : $ 4,067.00   Date Issued :           Merchant Status On NFUP :
Merchant Number :                              Merchant Name : 233202741994
Legal Name : INSTRUMENT TECH INC.              RC : R03-NO ACT/UNABLE TO LOCATE AUTHORIZATION
Requested By : Todd Roland
Date : 05/12/1998
Extension : 301766

CHECK ISSSUED TO

Block Update

Block Update for: BANK_BOSTON

⦿ Merchant Number: ☐
◯ Block update merchant name by merchant number
Merchant Name: ☐
◯ DDA:
◯ Block STATUS Upate by Description OR Print ID
◯ Block Update Processed Date:

File Create Date
☐ INACTIVE    Date: ☐
              Print ID: ☐

[OK]  [Cancel]

Queue Selection

Select the Platform/Source/Status below:

```
RSA
  ⊞ Incoming VISA/MC (Clearing)
  ⊞ VISA/MC Compliance
  ⊟ Credit Issue Compliance
       Open
       Pending Write Off Approval
       Resolved
  ⊞ Collections (FDMS Liability)
  ⊞ Collections (Straight)
  ⊞ Collections (Incoming)
  ⊞ Arbitration (X-3 and Forging)
  ⊞ Representment Rejects
  ⊞ Visa/MC Misc CR/DB Trans (Research)
  ⊞ Currency Conversion
  ⊞ Operational Liability (FDMS)
  ⊞ Research/Filing Fee
  ⊞ VISA/MC Prearb Accepts
  ⊞ Open M/C Chargebacks
  ⊞ Open Visa Chargebacks
```

78

76

[Ok]  [Cancel]

Selection Criteria

Field Name: MER_NUM
Equation: LIKE
Criteria: [          ]

[Find]

| ACH_SUSP_ID | MER_NUM | MER_NAME | TRANS_CD |
|---|---|---|---|

Number of Records

[Print]   [Close]

□ Queue Status                                              ☒

[Refresh] [icons] [?]

Select a Platform:
[TEST BANK T ▼]

| Mastercard Outgoing | Mastercard Incoming | Mastercard Representments | Visa Pre-Edit | Visa Outgoing | Visa Incoming |

Queue Status

[3D bar chart with categories: Open, Media Retrieval, MF Update, Write Off Request; x-axis Number of Transactions 0–5]

|  | New | Standard | Standard | Over Standard |
|---|---|---|---|---|
| Status | 11..17 | 18..31 | 32+ | |
| Open | 0 | 0 | 5 | |
| Media | 0 | 0 | 0 | |
| MF Update | 0 | 0 | 0 | |
| WO Appr | 0 | 0 | 0 | |

| Suspense ID | Age | Account # | ACS # | Type | Dollar Amount | Work of Date | Trans Date | |
|---|---|---|---|---|---|---|---|---|
| 1997324000019 | 176 | 4326902800003861 | | CR | 58.45 | 11/19/1997 | 11/19/1997 | |
| 1998005000143 | 142 | 5458000020004657 | 773431000401 | DB | 600.00 | 12/23/1997 | 10/21/1997 | 7544436729 |
| 1998005000033 | 159 | 5309310010092195 | | CR | 135.00 | 12/06/1997 | 08/26/1997 | |
| 1998005000151 | 130 | 5490990537007917 | 772521000101 | DB | 195.32 | 01/04/1998 | 06/22/1997 | 9244436717 |
| 1997353000066 | 169 | 5414703253265324 | | CR | 410.66 | 11/26/1997 | 08/11/1997 | |
| 1998005000034 | 159 | 5490990537001917 | | CR | 195.32 | 12/06/1997 | 07/10/1997 | |
| 1998015000096 | 120 | 4678058217919043 | 873491010101 | DB | 500.00 | 01/14/1998 | 09/19/1997 | 2460794726 |
| 1998015000097 | 120 | 4053559001158842 | 873561008101 | DB | 39.20 | 01/14/1998 | 08/26/1997 | 2460794723 |
| 1998016000003 | 119 | 5407561001499871 | | CR | 44.39 | 01/15/1998 | 01/14/1998 | |
| 1998021000006 | 114 | 4128003196062916 | | CR | 1058.00 | 01/20/1998 | 01/19/1998 | |
| 1998031000003 | 104 | 5191816505059391 | 773001006901 | CR | 141.00 | 01/30/1998 | 10/24/1997 | |
| 1998036000003 | 99 | 4436055800074452 | 872931008201 | CR | 135.00 | 02/04/1998 | 10/20/1997 | |
| 1998038000003 | 95 | 5407890262530894 | 780207000301 | DB | 135.00 | 02/08/1998 | 11/13/1997 | 7544436733 |
| 1998038000002 | 97 | 4678058217919043 | 873491010101 | CR | 500.00 | 02/09/1998 | 02/05/1998 | |
| 1998045000002 | 90 | 5401269209592588 | 772971001801 | CR | 1380.00 | 02/13/1998 | 10/01/1997 | |
| 1998049000013 | 132 | 5458000020004657 | 773431000401 | CR | 600.00 | 01/02/1998 | 12/31/1997 | |
| 1998052000003 | 83 | 4356024105730636 | 873231003601 | CR | 105.08 | 02/20/1998 | 10/01/1997 | 2460794727 |
| 1998056000033 | 79 | 4356024105730636 | 873231003601 | DB | 105.08 | 03/04/1998 | 10/01/1997 | |
| 1998064000008 | 71 | 4418029002367016 | 872581004201 | DB | 194.48 | 03/04/1998 | 07/11/1998 | |
| 1998064000012 | 71 | 4339071015058410 | 880221017701 | DB | 440.00 | 03/04/1998 | 01/16/1998 | 2460794800 |
| 1998065000002 | 70 | 5420392009022189 | 780081009301 | DB | 524.70 | 03/05/1998 | 11/11/1997 | |
| 1998072000054 | 63 | 5420392009022189 | 780081009301 | CR | 524.70 | 03/05/1998 | 11/11/1997 | 7044436731 |
| 1998078000048 | 57 | 4418029002367016 | 872581004201 | DB | 194.48 | 03/18/1998 | 05/31/1998 | 2460794719 |
| 1998082000013 | 112 | 4616130003304634 | 872971005401 | DB | 39.00 | 01/22/1998 | 09/19/1997 | |
| 1998089000052 | 46 | 4715000000177400 | 880221008301 | DB | 107.25 | 03/29/1998 | 11/11/1997 | 2460794731 |
| 1998089000053 | 46 | 4326891120185252 | 880571012901 | DB | 73.04 | 03/29/1998 | 12/20/1997 | 2460794735 |
| 1998090000081 | 45 | 4053559001158842 | 873561008101 | DB | 39.20 | 03/30/1998 | 08/28/1997 | |
| 1998090000082 | 45 | 4226310720068710 | 872751003001 | CR | 20.00 | 03/30/1998 | 03/30/1998 | |

Selected Queue: RSA/Credit Compliance/Open    Mode:    5/12/98    9:48 AM

FIG. 13

FDMS Integrated Suspense Processing System (Chargebacks)
File  Edit  View  Transaction(s)  Tools  Reporting  Help Move to: ▽

Work Queue | Item Detail

| FIELD NAME | ORIGINAL VALUE | CORRECTED VALUE |
|---|---|---|
| Suspence ID | | |
| ACS # | | |
| Work of Date* | 11/19/97 | |
| Chargeback Received Date* | | |
| Chargeback Resolved Date* | | |
| Sending ICA/BIN | 432690 | |
| Receiving ICA/BIN | 460794 | |
| Account # | 4326902800003861 | |
| Trans Type Code | 20 | |
| Reason Code | | |
| Issuer Control # | | |
| Transaction Date | 11/19/97 | |
| Us Currency Amount | 58.45 | |
| Reference # | 2460794717401000032522 | |
| Message Text | | |
| Documentation Type | | |
| Currency Code | 840 | |

* Indicates that the field is NOT revisable

Resolution Information:

Investor's Notes rcvd a credit of 58.45 on 11-19 frwd to 12136 queue accptd cr iss compl case cntl 8724010019

[Update]

[Previous]  [Next]

Record 1 of 53 | Selected Queue: RSA/Credit Issue Compliance/Open | Mode: | 5/14/98 | 9:55 AM

Merchant Chargeback "K" Resolution

Reason Code: [ ]

ACS Control Num: [ ]

Special Messages:

Any messages can be saved as the Default message by selecting the check box below.

☐ Save Custom Message as Default

☐ Print K-Resolution Form Immediately

[Submit] [Cancel] [Help]

Write Off Request

Credit Account: [ ]  ACS Control Num: [ ]

Debit Account: [ ]  Amount: [21.20]

Justification:
[01 MISSING MEDIA]

Reason Note:
[ ]

[Submit] [Cancel] [Help]

Detail Multiple Column Update

Update: TRN_TYPE_CD

Current Value:
[ ]  [Update]

Replacement Value:
[ ]  [Cancel]

Match Off

Difference
94.43

Item To Match
1997314000005  194  4482210010002628  94.43 DB  11/06/1997  08/09/1997
1997318000011  188  4024116002215554  159.50 DB  11/12/1997  08/31/1997

Probable

☐ Match Dollar Amount

FIRST DATA CORP

Integrated Suspense Processing System

Help
Cancel
OK 120
122

FIG. 23

Find Transaction Query

Platform: RSA
Cardholder:
Dollar: 7.66
Merchant Number:
Acquirer Ref Num:

Transaction Date
From: To:

Work of Date
From: To:

[Find] [Cancel]

FIG. 24

Report Manager

Report | Criteria

Reports:
- ○ Daily Productivity Log
- ○ Merchant Chargeback Detail
- ○ Resolution Log
- ○ Print Media Requests
- ○ Override Detail
- ● Override Summary
- ○ Override Batch
- ○ Suspense Aging
- ○ Suspense Queue Summary
- ○ Work in Progress Detail
- ○ Work in Process Summary
- ○ Write Off Detail Print Destination
- ○ Print to Window
- ● Print to Printer Copies
Number of Copies: 1

[Print] [Cancel] [Help]

Netscape

File Edit View Go Communicator Help

Back Forward Reload Home Search Guide Print Security Stop

Bookmarks Netsite: hhtp://dev1.md.fdms.firstdata.com/funding/drill.htm

Instant Message  Internet  Look-up  New&Cool

144

1DC FIRST DATA CORP. Merchant Services

Funding Settlement Integrated Suspense Processing System

- Authorized Transaction
- Input Transaction
- WIP Summary
- WIP Detail
- Resolution Report
- Write Off Report
- Bank Wire Report
- Remit Download Build Work in Process Detail Funding Settlement Report Please Enter Report Criteria Select Platform: TEST BANK T Begin Work of Date: 01-JUN-98   Ending Work of Date: 01-JUN-98

Submit

Document: Done

FIG. 30

```
▽ PTS  Alliance Reject Investigation For TEST BANK Y         [_][□][×]
File  Edit  Help
┌─────────────────────────────────────────────────────────────────┐
│ Merchant Number:        Merchant Name:                          │
│ 027200024993            LASTING IMPRESSIONS                 [▽] │
│ Reject Date: 14-JUL-97  Submission Amount: $2.00  Terminal ID: 45168 │
│ Sub ID: 97108W3200      Reject Amount: $1.00      Reason: 10    │
└─────────────────────────────────────────────────────────────────┘
│ Navigate │ Detail View │ Print Options │ Utilities │
┌─────────────────────────────────────────────────────────────────┐
│ User ID: TOLAND        Date Worked: 14-JUL-97   Posted: Test [▽]│
│ Status: Inactive [▽]   Comments: TEST ACCT                  [▽] │
│ Note:                                                           │
└─────────────────────────────────────────────────────────────────┘
              Current Record: 1 of 398
              [|◁]  [◁]  [▷]  [▷|]
              Batch ID - 745168182056 | TEST BANK Y | 5/15/98
```

FIG. 31

```
▽ PTS  Alliance Reject Investigation For TEST BANK Y         [_][□][×]
File  Edit  Help
┌─────────────────────────────────────────────────────────────────┐
│ Merchant Number:        Merchant Name:                          │
│ 027200024993            LASTING IMPRESSIONS                 [▽] │
│ Reject Date: 14-JUL-97  Submission Amount: $2.00  Terminal ID: 45168 │
│ Sub ID: 97108W3200      Reject Amount: $1.00      Reason: 10    │
└─────────────────────────────────────────────────────────────────┘
│ Navigate │ Detail View │ Print Options │ Utilities │
┌─────────────────────────────────────────────────────────────────┐
│ Name:                              Address:                     │
│ Number:         Status:   Cat Code:                             │
│ ┌ Filter Grid ─────────────┐  ┌ Exclude from Report ┐           │
│ [     ▽    ]  [ Refresh ]     □ Diners  □ JCB  □ Visa           │
│ [▽] [           ]              □ AMEX   □ Disc  □ MC            │
│ SUB_ID | MER_NUM | CARD_HOLD_ACC... | TRN_TYPE_CD | US_CURRENCY │
└─────────────────────────────────────────────────────────────────┘
              Batch ID - 745168182056 | TEST BANK Y | 5/15/98
```

PTS Alliance Reject Investigation FOR TEST BANK Y

File  Edit  Help

Merchant Number : 02720024993
Merchant Name : LASTING IMPRESSIONS

Reject Date : 14-JUL-97
Submission Amount : $2.00
Terminal ID : 45168

Sub ID : 97108W3200
Reject Amount : $1.00
Reason : 10

Navigate | Detail View | Print Options | Utilities

Lookup Options
◉ Reasons   ○ Comments   ○ Banks

| Reason Code | Reason Desc. |
|---|---|
| 01 | M-REC MISSING OR INVALID |
| 07 | B-REC MISSING OR INVALID |
| 09 | DETAIL RECORD BYPASSED |
| 10 | INVALID CARDHOLDER ACCOUNT NUMBER |
| 11 | INVALID TRANS CODE OR NOT ENTITLED F |
| 12 | INVALID TRANSACTION AMOUNT |

Change Password
Old Password :
New Password :
Confirm New :

[Change]

Batch ID - 74516818 2056 | TEST BANK Y | 5/15/98

Find Record

Database To Search
- ⦿ Reward  ○ Archive  ○ Bank Wire

Search Fields

Batch Number: [    ]  Account Number: [  ]

Check Number: [    ]  Clerks First Name: [    ]

Merchant Name: [    ]  Clerks Last Name: [    ]

Card Holders Name: [    ]

Use the % symbol as a wildcard character.

Records Found

| Batch | Account | Clerks First Name | Clerks Last Name | Merchant | Card Holder Name | Check Number |
|-------|---------|-------------------|------------------|----------|------------------|--------------|
|       |         |                   |                  |          |                  |              |
|       |         |                   |                  |          |                  |              |

Number of records found:

[Find] [Help] [Cancel]

FIG.39

FUNDING AND SETTLEMENT INTEGRATED SUSPENSE PROCESSING SYSTEM

TECHNICAL FIELD

The present invention relates generally to the consolidation into a single source work flow database for work in progress suspense transaction processing and the distributed presentation of transaction details for credit card acquiring systems.

BACKGROUND ART

A combination of computer generated paper reports and manually generated spreadsheet inventory queues were used in the past for the presentation of transaction details to credit card acquiring systems. A problem with this approach is that the labor intensive process of combining the reports and the spreadsheets is directly proportionate to the level of transaction volume. This is a constraint to future growth in terms of labor resources, facilities, and the amount of time required to manually compile and track the data. Another problem with this approach is that because of the numerous information sources (reports and spreadsheets) there is no single (centralized) source for work in progress suspense transaction processing.

What is needed is an on-line work in progress access and processing, tracking, and reporting of daily suspense transaction detail for acquiring bank clients. Suspense transaction detail includes detail about credit transactions between merchants and consumers and suppliers. An acquiring bank client is a bank that maintains a relationship with a merchant and receives all transactions from the merchant and settles on the merchant's behalf.

SUMMARY OF THE INVENTION

Accordingly, it is an object of the present invention to provide financial reporting applications for use on the World Wide Web (WWW) by external bank clients.

In carrying out the above object and other objects, the present invention provides a method reporting suspense transaction detail to acquiring banks. The method includes compiling financial transaction information to a database. The information in the database is then routed to a server operable with the World Wide Web. The financial transaction information from the server is then accessed at a client station operable with the World Wide Web.

The advantages of the present invention are numerous. For example, the present invention eliminates the need for manually generated suspense inventory spreadsheets populated from paper reports (manual re-entry). The present invention also accelerates delivery, presentation, and resolution of suspense transactions for acquiring bank clients.

These and other features, aspects, and embodiments of the present invention will become better understood with regard to the following description, appended claims, and accompanying drawings.

BRIEF DESCRIPTION OF THE DRAWINGS

FIG. 1 illustrates a general block diagram of a system for implementing the present invention;

FIGS. 2–10 illustrate forms for use with the automated clearing house (ACH) application of the present invention;

FIGS. 11–25 illustrate forms for use with the chargeback application of the present invention;

FIGS. 26–29 illustrate forms for use with the funding application of the present invention;

FIGS. 30–37 illustrate forms for use with the PTS application of the present invention; and FIGS. 38–57 illustrate forms for use with the rewards application of the present invention.

BEST MODES FOR CARRYING OUT THE INVENTION

Figure 18:
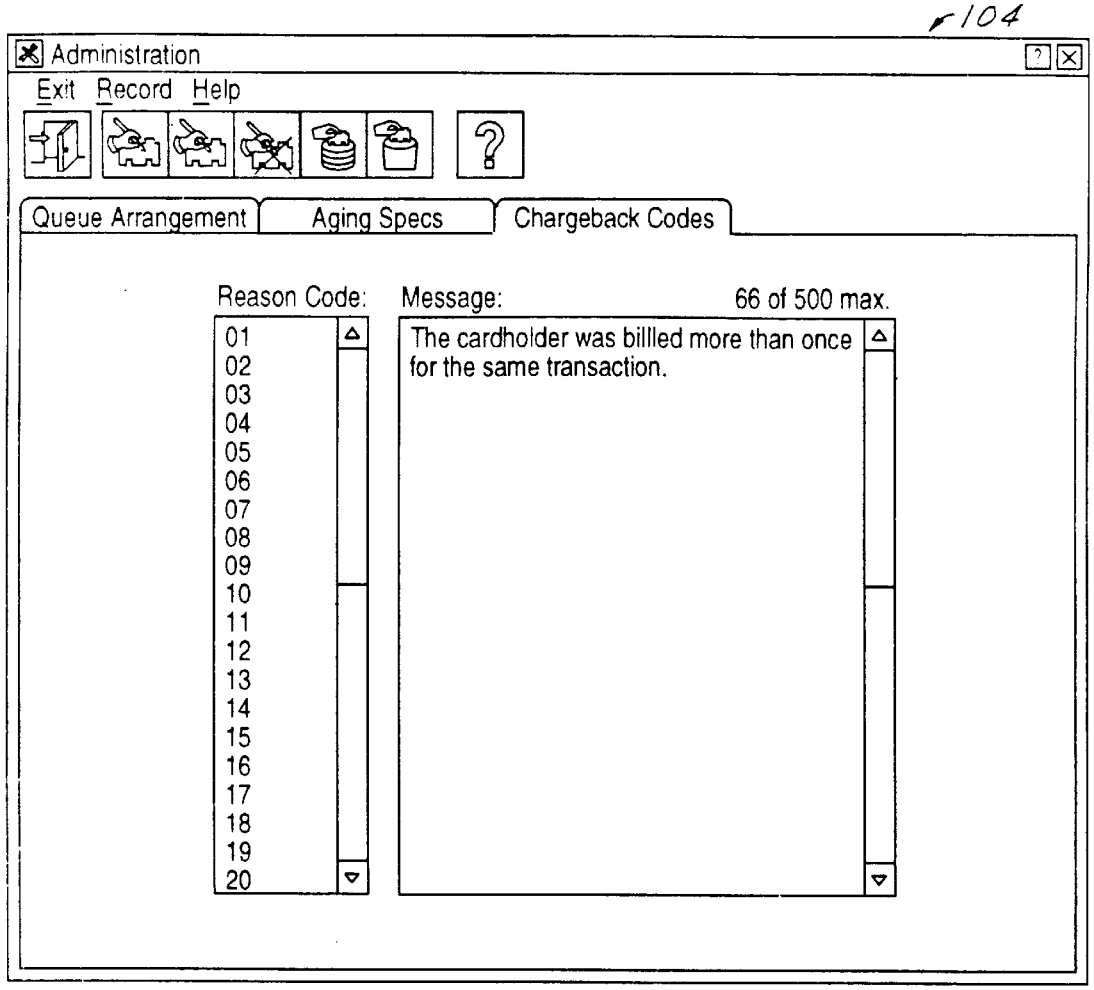

Referring now to FIG. 1, a system 10 for implementing the present invention is shown. System 10 includes a mainframe 12, a database 14, a server 16, and a client station 18. Mainframe 12 is operable to receive information from automated clearing house (ACH) core system 20, chargeback core system 22, funding core system 24, paperless transaction service (PTS) core system 26, and rewards core system 28.

The automated clearing house is a central distribution and settlement point for electronic items exchanged between financial institutions.

The chargeback identifies transactions that have been challenged by a card holder and returned through interchange to the acquiring bank by a card holder issuing bank.

The interchange is the domestic and international systems operated by credit card companies for authorization and settlement, and the passing of other fees and information.

Settlement is the process by which the merchant and card holder bank exchange financial data and value resulting from sales transactions, cash advances, merchandise credits, etc.

The PTS is a First Data Merchant Services system containing a series of edit packages used to ensure all electronic transactions are complete and can be processed.

Mainframe 12 includes a series of COBOL 2 jobs that capture detail level rejected financial transaction information from core systems 20, 22, 24, 26, and 28. Mainframe 12 validates and then provides the information to database 14. Database 14 is preferably provided by ORACLE Corp. and resides on server 16. Database 14 contains procedures and calls that capture the detail transaction level data that is supplied from mainframe 12. Database 14 stages the financial information to make it available from a server 16 to a user at client station 18 via World Wide Web 17.

The information is accessed via a separate application deployed in client station 18 for each department area, i.e., ACH, chargeback, funding, PTS, and rewards. The applications include graphical user interfaces installed on client station 18. A user accesses the applications via the World Wide Web (WWW) at client station 18 to request data from database 14 residing on server 16. The graphical user interface of the applications allows the user to review, update, and resolve suspense transaction information on-line. Several of the suspense resolution applications produce on-line transaction files which are transferred to mainframe 12 for systematic reprocessing into the core system streams. As described below, many report options are available within the various applications to view work in progress detail and summary information, resolution logs, and an assortment of forms.

Figures 9, 10:
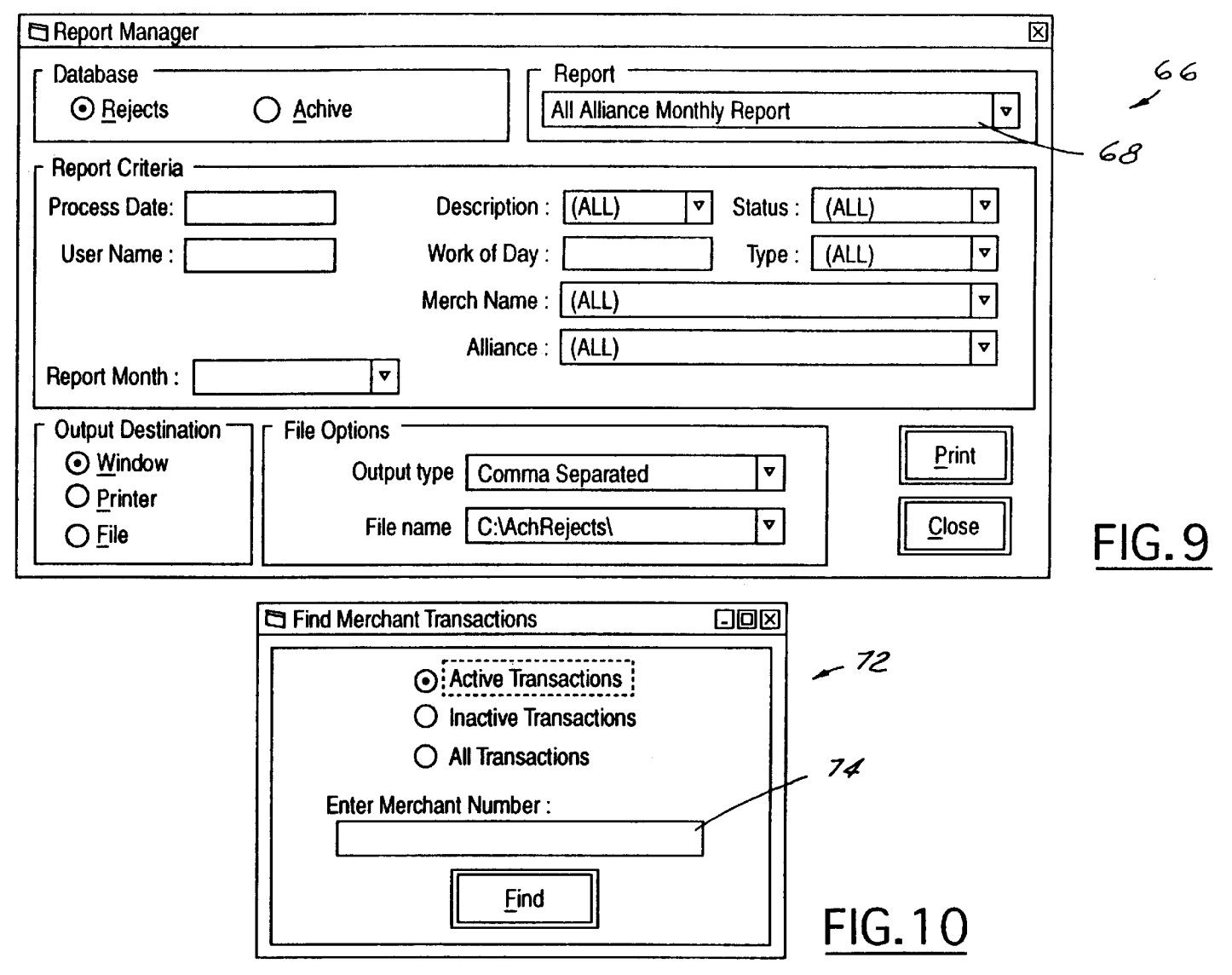

Referring now to FIGS. 2–10, forms displayed on client station 18 when a user is using the ACH application are shown. ACH rejects main form 30 shown in FIG. 2 is invoked when the user has logged onto the ACH application. Form 30 is used to retrieve and view the work list for the alliance selected in alliance box 32. The retrieved merchants are displayed in a list format in area 34. The user may select individual or multiple items to update. Form 30 is used to initiate all processing on ACH reject transactions.

Transaction detail form 40 shown in FIG. 3 is invoked from ACH rejects main form 30 by selecting a merchant from area 34. Form 40 displays the detail transaction data for the selected merchant. The user may update the transaction with corrected data values.

MISC form 50 shown in FIG. 4 is invoked when the MISC button 42 is selected on transaction detail form 40. Form 50 is used to record the necessary MISC information to produce the MISC report. Splash form 52 shown in FIG. 5 is displayed when merchant records are being updated by ACH rejects main form 30.

Check request form 54 shown in FIG. 6 is invoked when check button 44 of transaction detail form 40 is selected. Form 54 is used to record the necessary check request information to produce a check.

Block update form 58 shown in FIG. 7 is invoked when block update button (not specifically shown) from reports menu 36 is selected from ACH rejects main form 30. Form 58 is used to update a block of records for an alliance based on the criteria entered.

Find transaction form 62 shown in FIG. 8 is invoked by selecting find transaction button 38 from ACH rejects main form 30. Form 62 is used to search the transaction based on the criteria entered. The transactions found are displayed in grid 64 and may be edited.

Report manager form 66 shown in FIG. 9 is invoked by selecting report manager button 39 from ACH rejects main form 30. Form 66 is used to print reports based on the report selected in report box 68 and the criteria entered.

Find merchant transactions form 72 shown in FIG. 10 is invoked by selecting next merchant button from ACH rejects main form 30. Form 72 is used for searching for transactions based on the merchant number entered in merchant number box 74.

Referring now to FIGS. 11–25, forms displayed on client station 18 when a user is using the chargeback application are shown. Suspense queue selection form 76 shown in FIG. 11 is used to designate which suspense queue to retrieve. The user must select a platform, suspense queue, and status combination. Only authorized platforms and suspense queues for the current user are displayed in queue selection window 78.

Suspense work queue form 80 shown in FIG. 12 is used to retrieve and view the suspense transactions that the user is authorized to resolve. The retrieved suspense transactions are displayed in a list format in area 82. The user may select individual or multiple items to update and/or resolve. Form 80 is used to initiate all processing on suspense transactions.

Item detail form 84 shown in FIG. 13 is invoked from suspense work queue form 80 by selecting one or more suspense transactions. Form 84 displays the detail data for the selected transaction. The user may update the transaction with corrected data values and choose a resolution method. Form 84 contains a tool bar used to initiate record navigation and resolution processing.

Merchant chargeback form 88 shown in FIG. 14 is used to record the necessary merchant chargeback information to produce a K-resolution print form. Selecting submit button 90 causes a SQL statement to be built to update the selected suspense transaction(s) with the information from form 88.

Write off resolution form 92 shown in FIG. 15 is invoked when the write off resolution is selected for a suspense transaction. Form 92 is used to record the necessary information to produce a write off request form. Selecting submit button 94 causes a SQL statement to be built to update the selected suspense transaction(s) with the information from form 92.

Queue status form 96 shown in FIG. 16 is used to build a graphical representation of the total transaction counts in the interchange suspense queues by platform.

Figure 17:
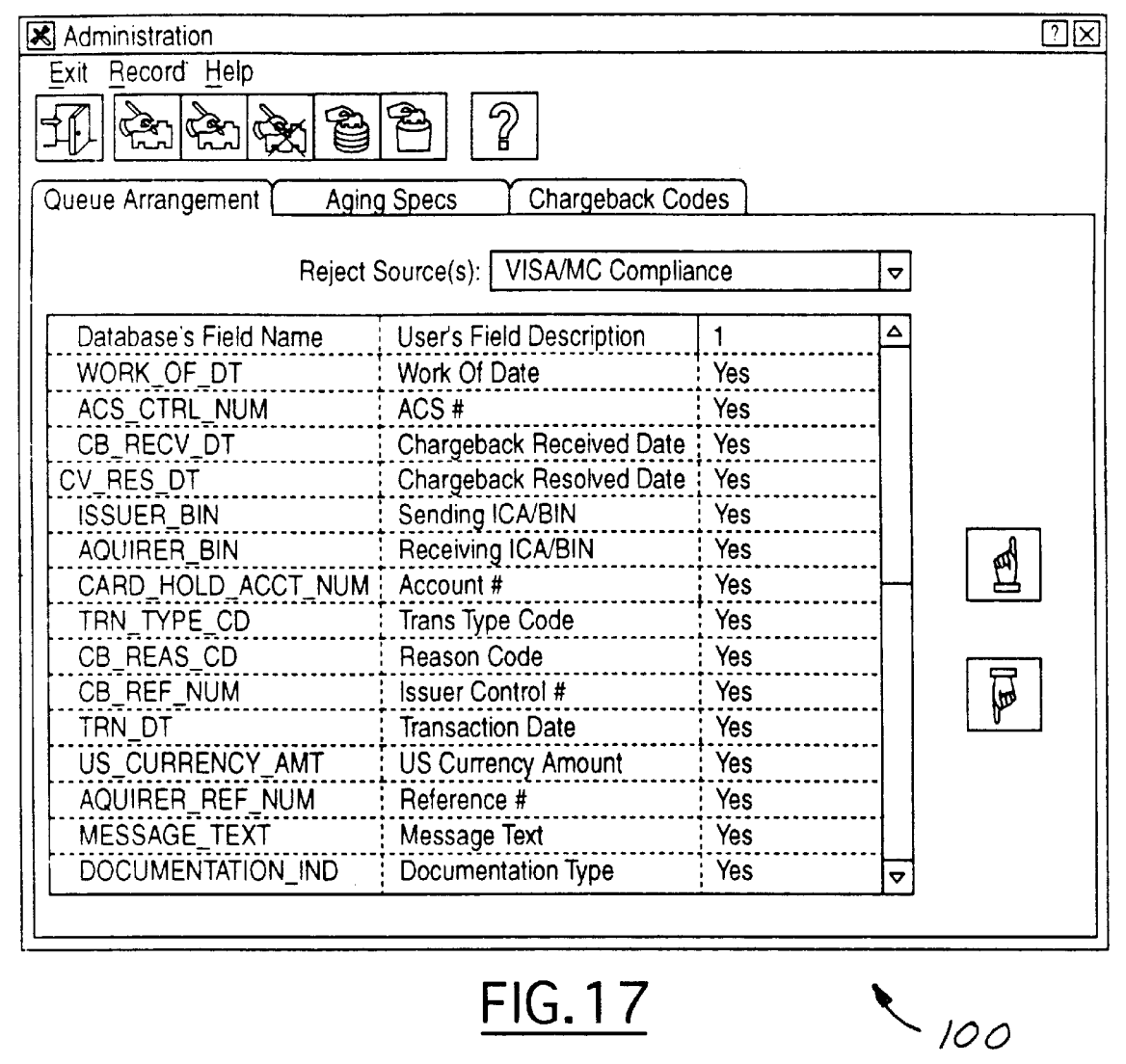
Figure 19:
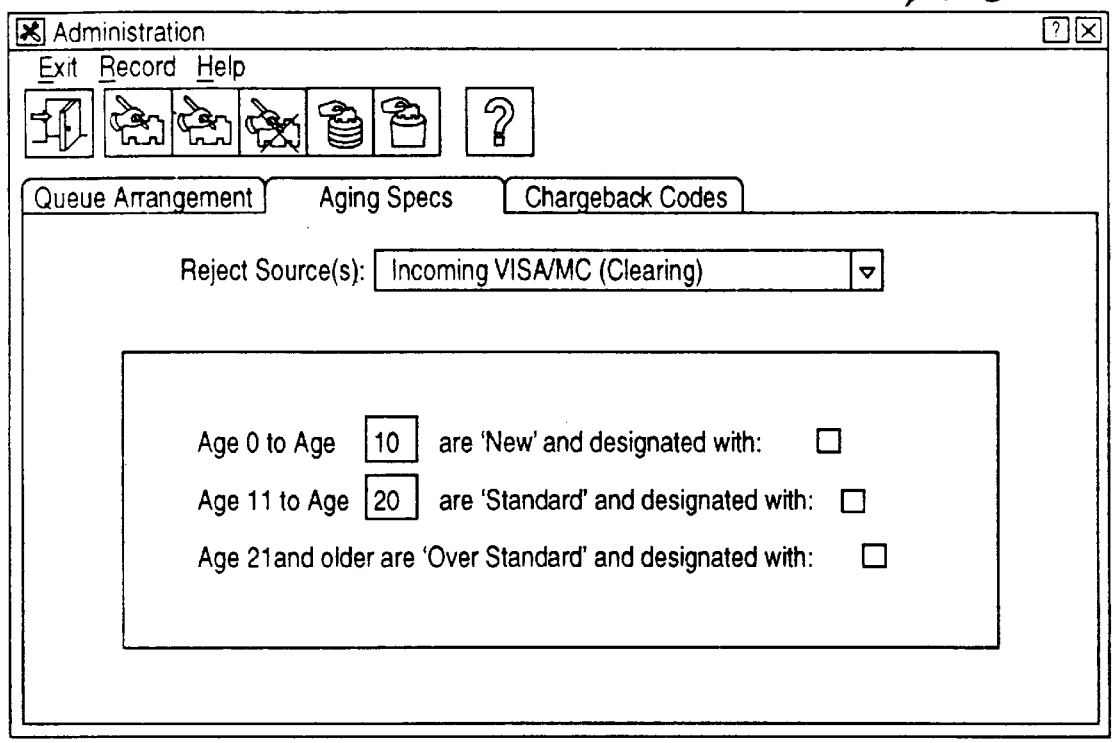

The administration function includes three tab forms: queue arrangement tab form 100 shown in FIG. 17, chargeback codes tab form 104 shown in FIG. 18, and aging specs tab form 108 shown in FIG. 19.

Form 100 is used to modify the view of transaction information by edit package. Form 100 also maps suspense database field names to a more user friendly field name, determines which of these fields are to be visible to the application user, and establishes the order in which these fields are to be displayed in the Work Queue—Item Detail tab on a per suspense type basis.

Form 104 is used to add, modify, or delete suspense processing chargeback codes. Form 108 is used to set age day threshold limits for all suspense transactions. The corresponding icon is displayed next to each transaction in the work queue form to indicate its age category.

Figure 20:
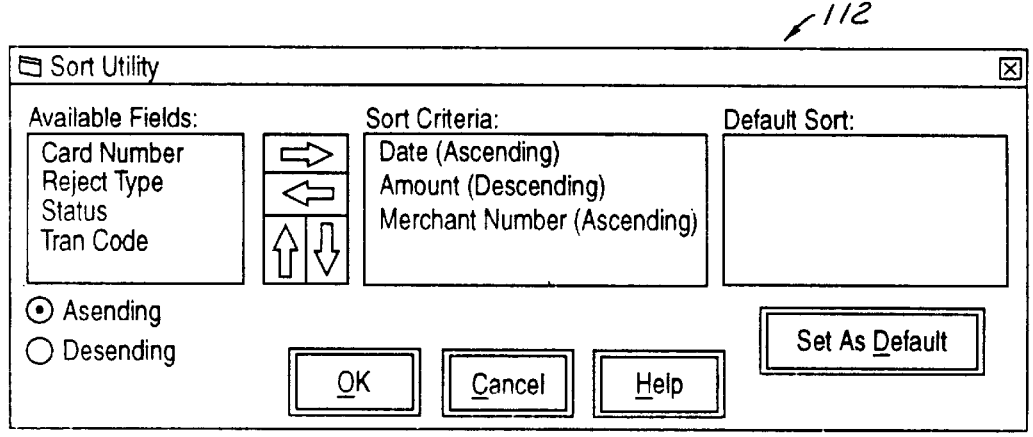

Sort utility form 112 shown in FIG. 20 is invoked by choosing the sort utility option from the options menu on suspense work queue form 80. Form 112 is used to create a user-defined sort for the suspense transactions displayed in suspense work queue form 80. The user may save the defined sort to be used for all suspense work queues retrieved.

Figure 21:
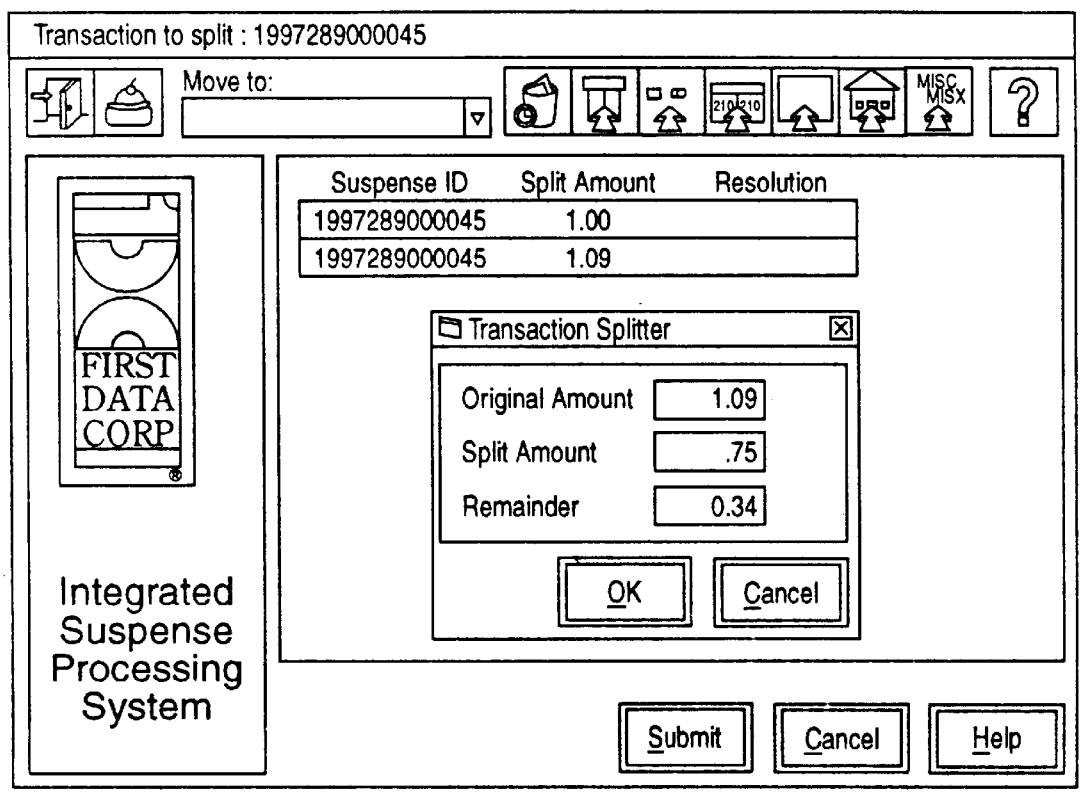
Figure 26:
Figure 27:
Figure 29:

Split/resolve transaction form 116 shown in FIG. 21 allows the user to split a transaction into two or more new transactions for the purpose of resolving a portion of the original transaction against a partial credit or debit received from an issuing bank. The data contained in these new transactions is the same as the original with the exception of the suspense ID and the dollar amount. The sum of the dollar amounts of the new transactions are equal to the amount of the split transaction.

Match off form 120 shown in FIG. 22 is used to wash multiple transactions from other queues against a single transaction in the incoming credit card queue, i.e., VISA/MasterCard queue. All the transactions from the incoming credit card queue appear in list box 122 when form 120 is initially displayed. When the user selects one of the transactions in list box 122 a query is performed against all remaining queues based on the ACS control number and optionally the dollar amount. The result of this query is loaded into another list box just below the one containing the incoming transactions. The user then selects which transactions in the lower list box should be washed against the incoming transaction in the upper list box. Having made the appropriate selections in the lower list box the user may now initiate the resolution.

Find transaction utility form 124 shown in FIG. 23 allows the user to enter values for any or all of the available search criteria on the form in order to locate a specific transaction or group of transactions. The result set from the query is displayed in the work queue grid.

Figures 25, 35, 37:
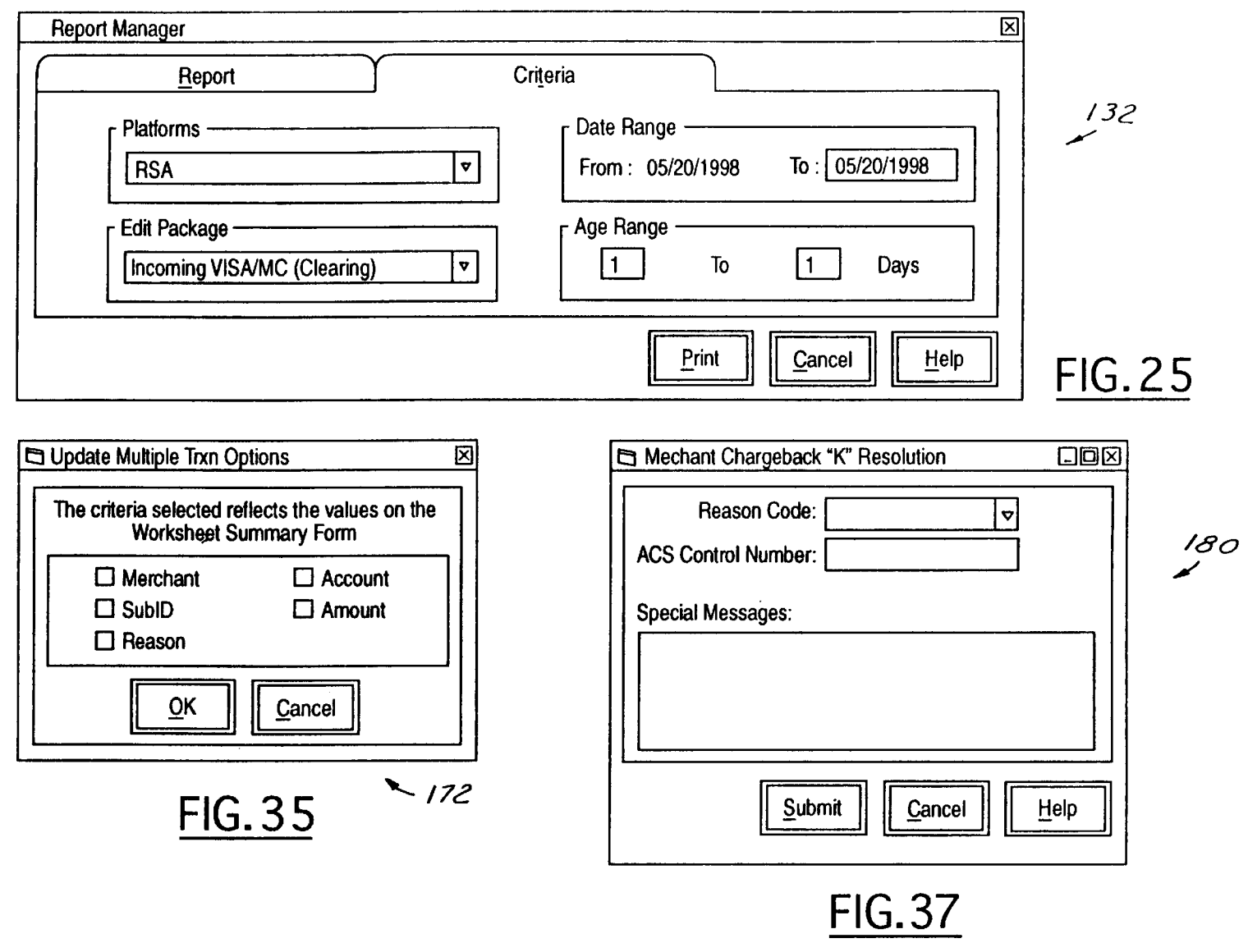

The report manager function includes two tab forms: report form 128 shown in FIG. 24 and criteria form 132 shown in FIG. 25.

Referring now to FIGS. 26–29, forms displayed on client station 18 when a user is using the funding application are shown. Main screen form 136 shown in FIG. 26 appears upon a successful log in of the funding application via the World Wide Web (WWW). Reject detail form 140 shown in FIG. 27 appears when the user selects a reject type hyperlink. Report criteria form 144 shown in FIG. 28 appears when the user selects one of the report buttons. Input transaction form 144 shown in FIG. 29 appears when the user presses the input transaction button.

Referring now to FIGS. 30–37, forms displayed on client station 18 when a user is using the PTS application are shown. The report investigation function includes three tab forms: navigate tab form 152 shown in FIG. 30, detail view tab form 156 shown in FIG. 31, print options tab form 160 shown in FIG. 32, and utilities tab form 164 shown in FIG. 33.

Form 152 displays some transaction data and provides the means to navigate through the transactions and update multiple records. Form 156 displays transaction details. Form 160 is used to print reports. Form 164 is used to change password or view look up tables.

Figures 32, 34:

Input alliance data form 168 shown in FIG. 34 is used to import alliance data. Update multiple transaction options form 172 shown in FIG. 35 is invoked when the multiple update button is selected from the navigation tab on reject investigation form. Multiple column update form 176 shown in FIG. 36 is used to update the data in the column selected. Merchant chargeback 'K' resolution form 180 shown in FIG. 37 is used to update resolution records and print the merchant chargeback report.

Figure 40:
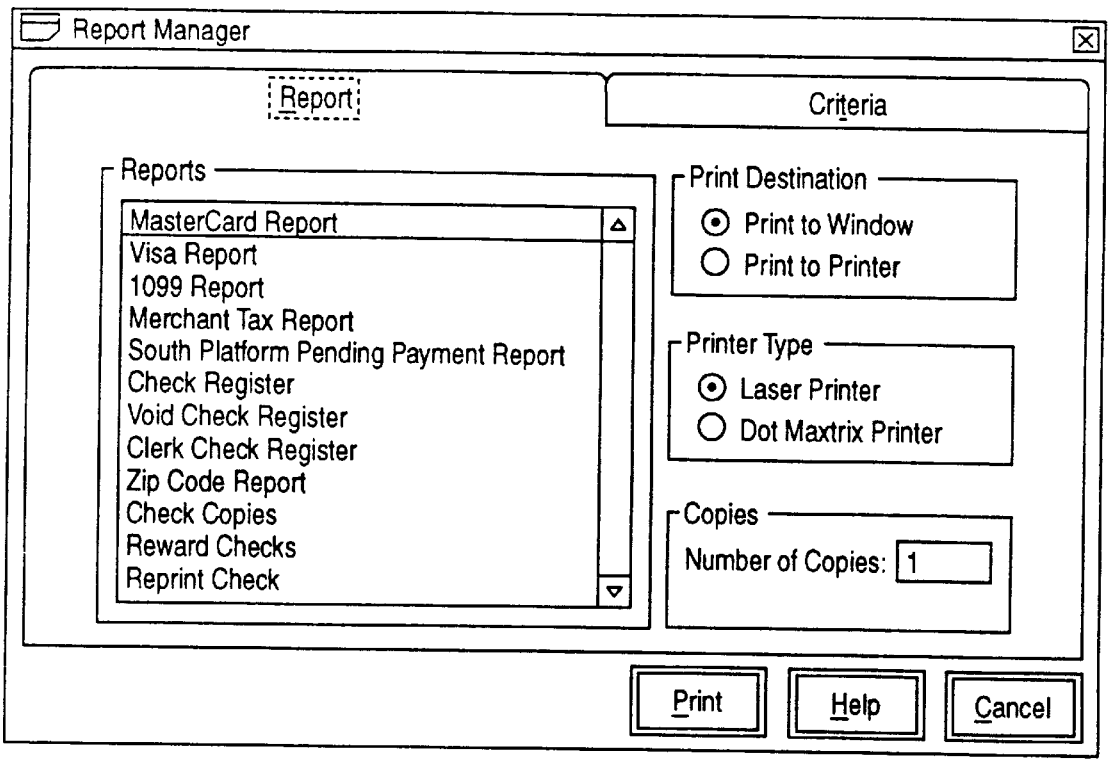
Figure 41:
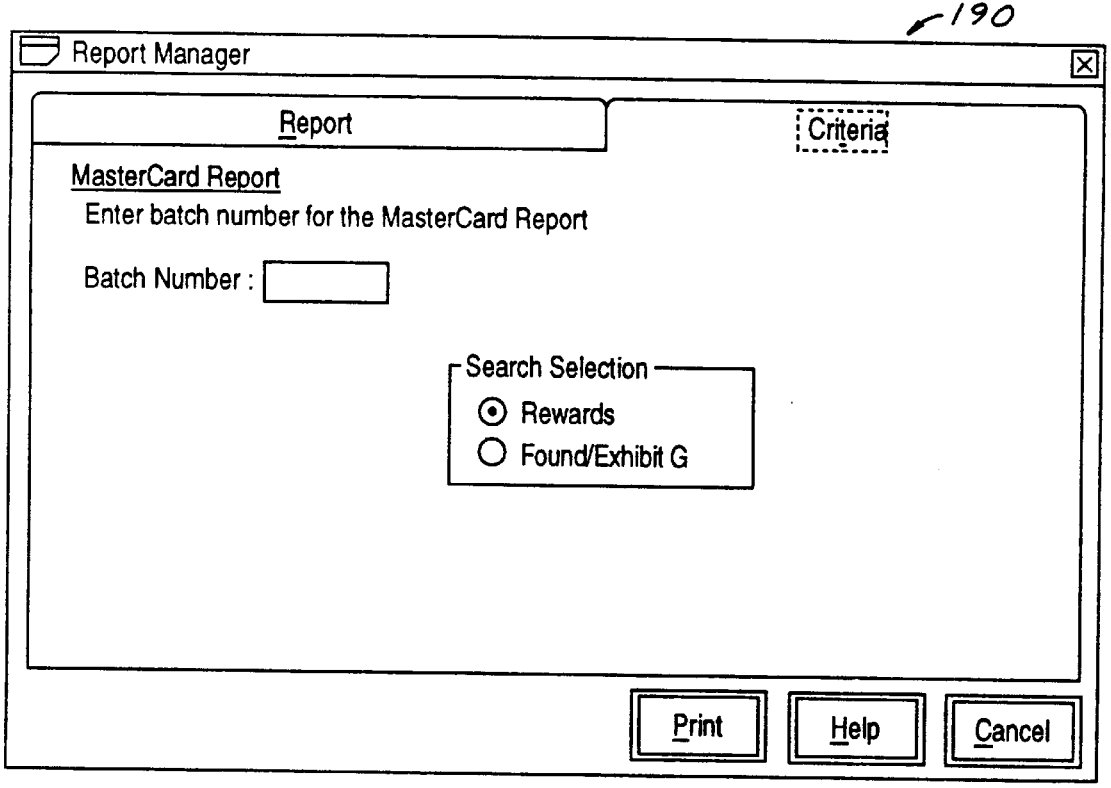
Figure 42:
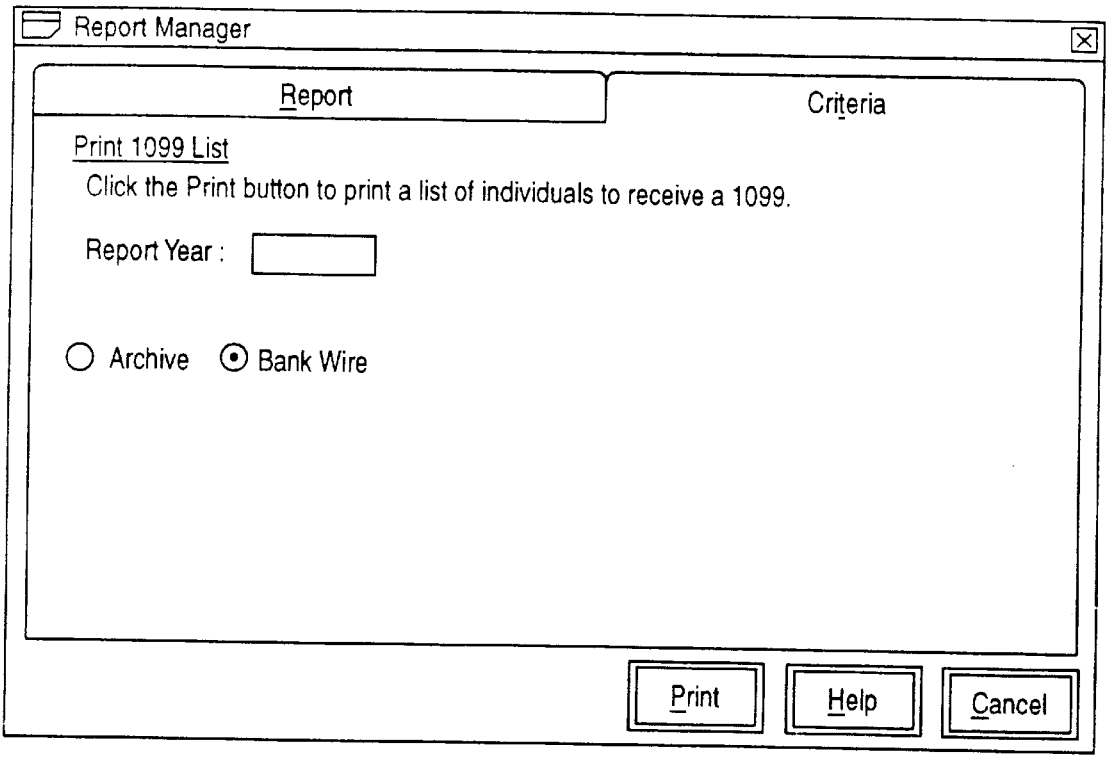

Referring now to FIGS. 38–57, forms displayed on client station 18 when a user is using the rewards application are shown. Main rewards form 184 shown in FIG. 38 allows the user to enter, edit, and update transaction information. Find transaction form 188 shown in FIG. 39 is where the user is able to find transactions by entering in of the listed search criteria. Main report selection form 192 shown in FIG. 40 is the main report manager form that users are able to select the listing of reports to generate. Credit card report form 196 shown in FIG. 42 is where the user enters the batch number for those credit card transactions to be printed. The user has to enter the batch number and select either Rewards or Found/Exhibit G. This dictates which report is produced. 1099 selection criteria form 200 shown in FIG. 42 is used for a listing of those individuals that have accumulated over a certain dollar amount that warrants the IRS issuing a 1099 report.

Figure 43:
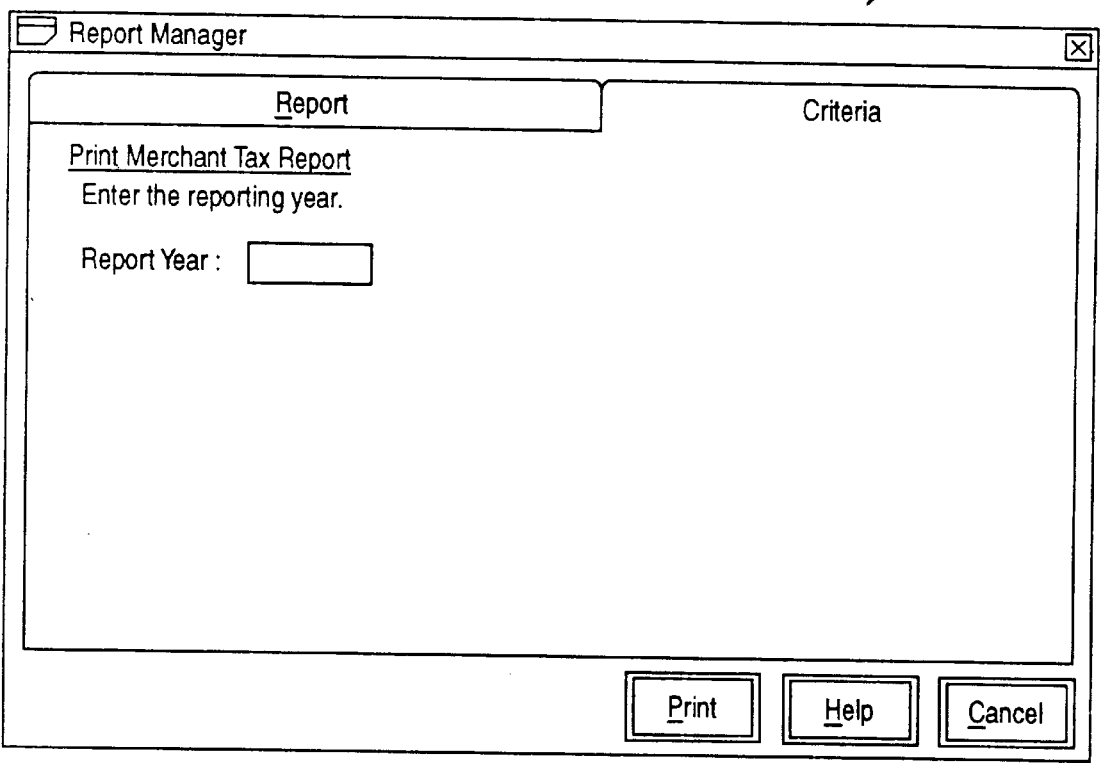
Figure 44:
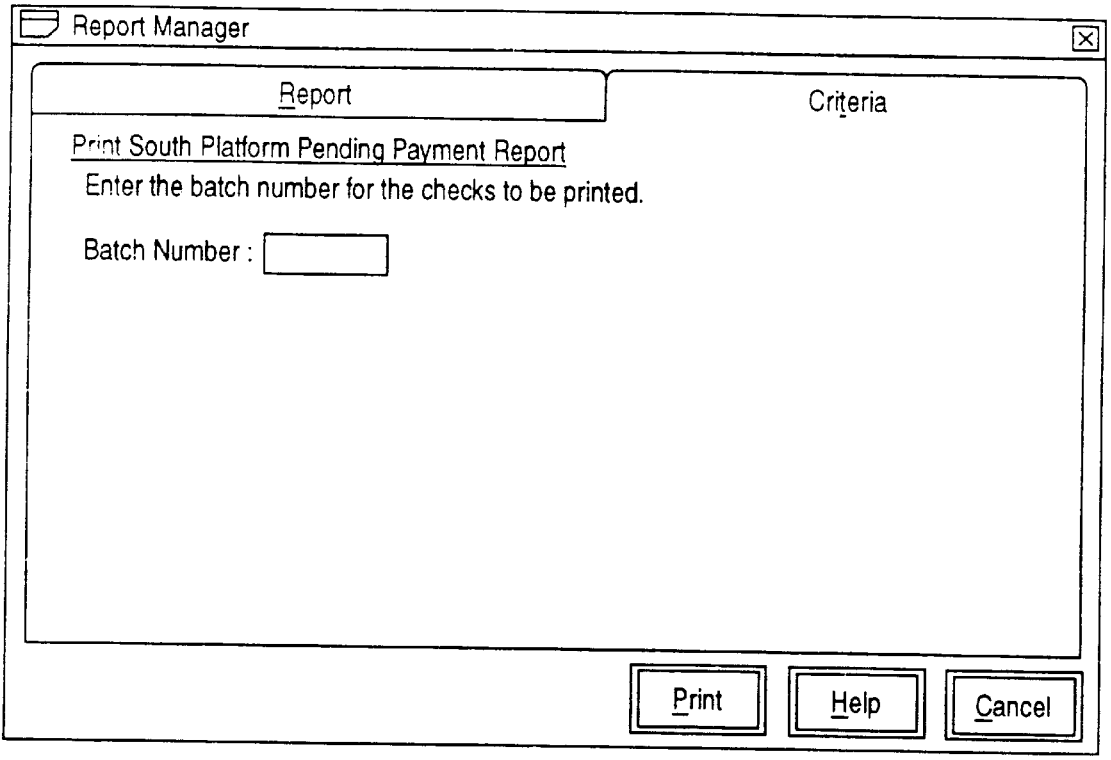
Figure 45:
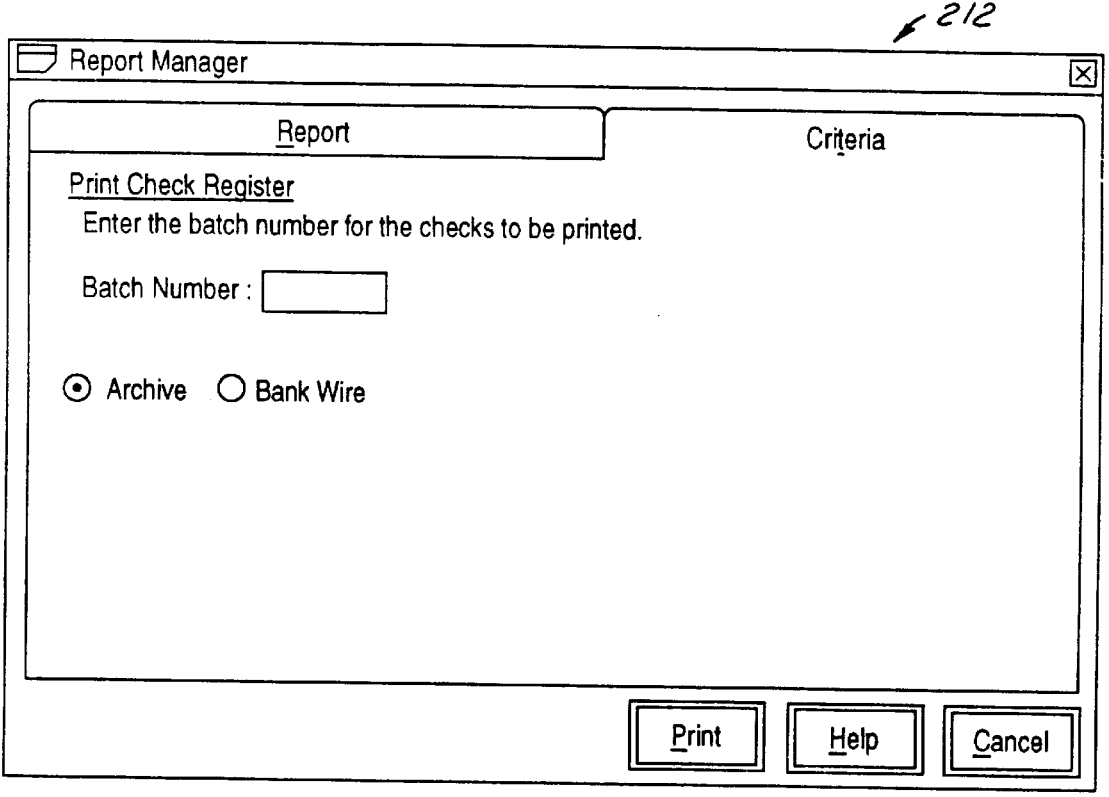

Merchant tax selection criteria form 204 shown in FIG. 43 is used for printing a merchant tax report. South platform pending payment selection criteria form 208 shown in FIG. 44 is used to produce a report from the transactions received from the south platform. Check register selection criteria form 212 shown in FIG. 45 allows a user to produce a check register report after producing a batch of checks.

Figure 46:
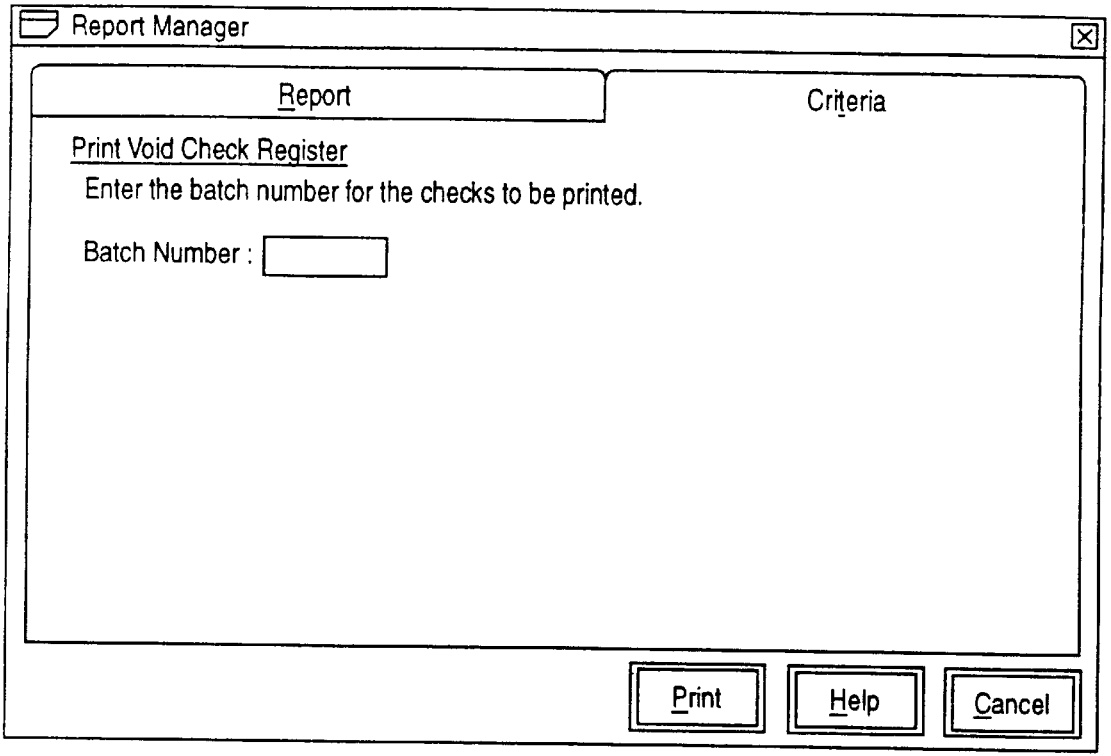
Figure 47:
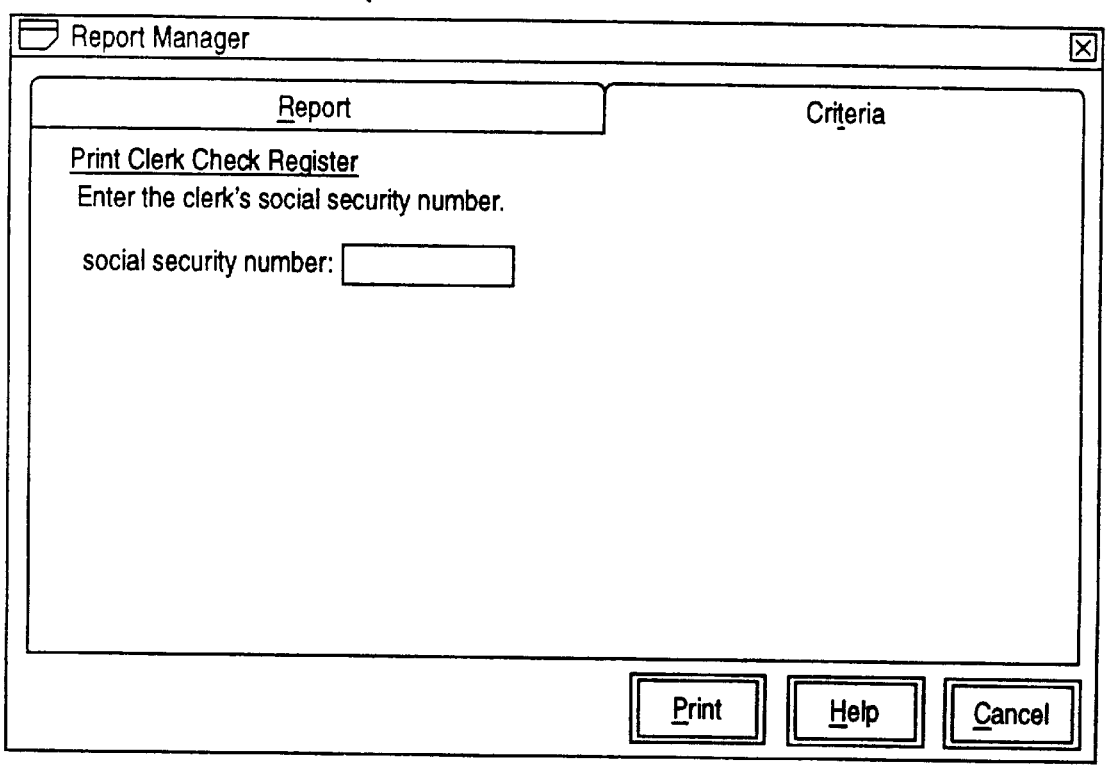
Figure 48:
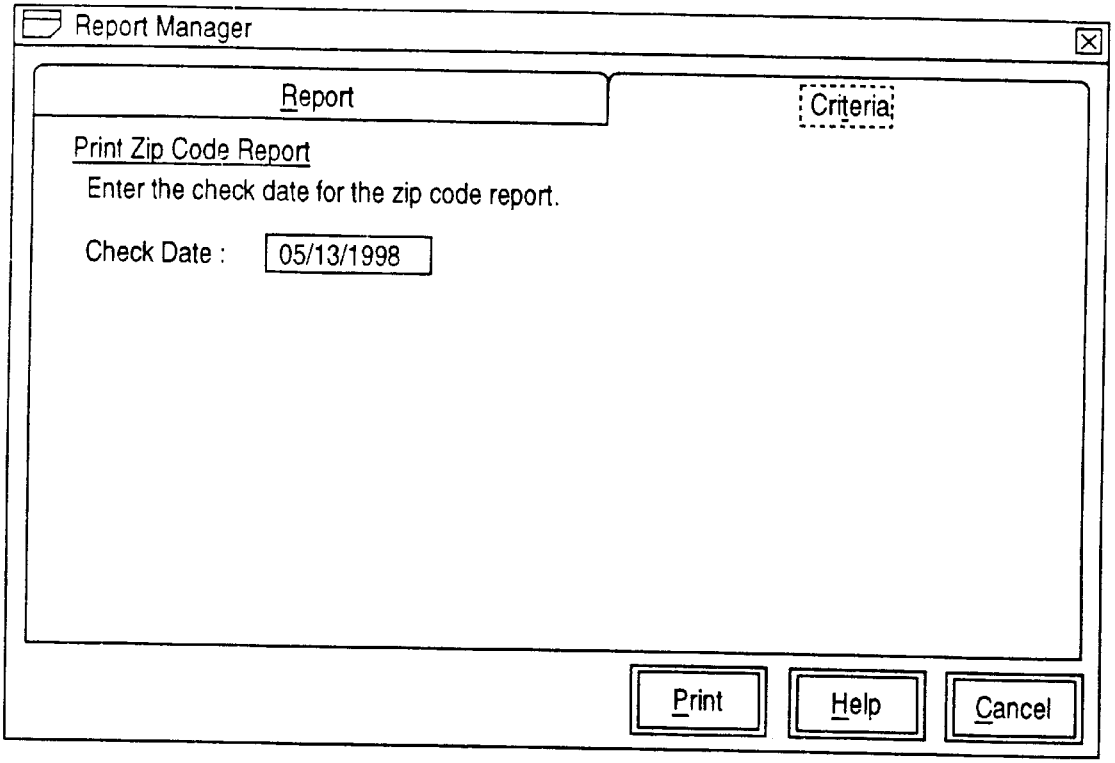
Figure 49:
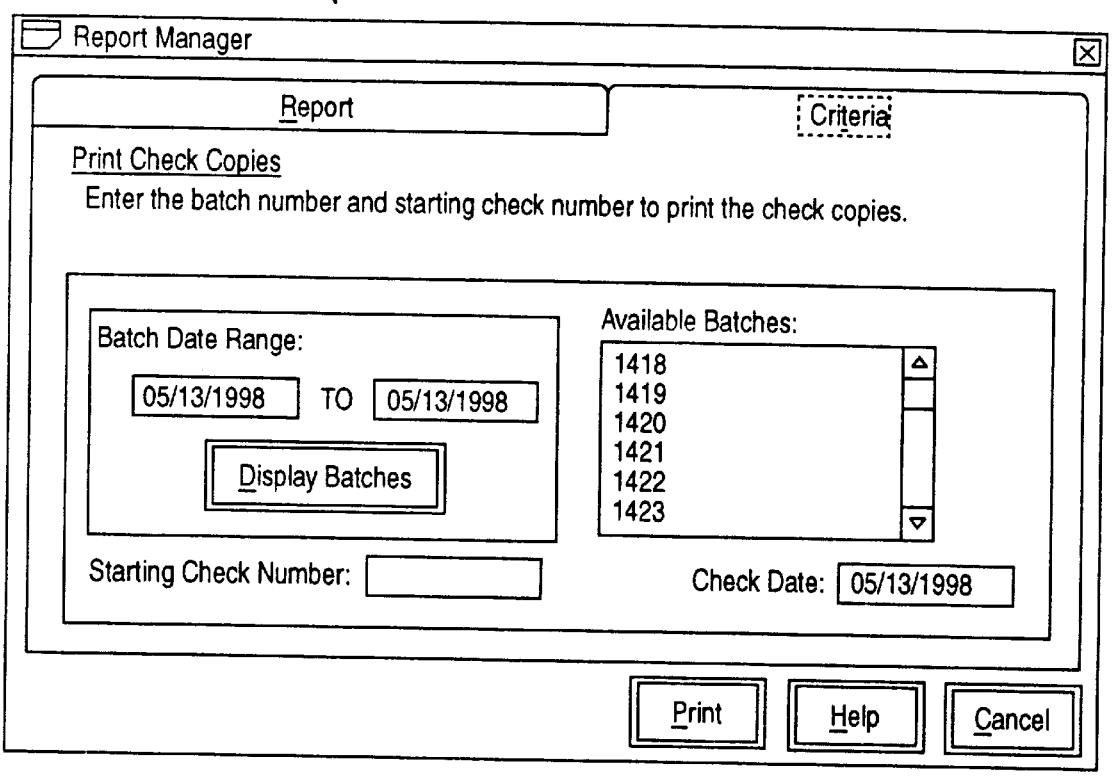

Void check register selection criteria form 216 shown in FIG. 46 allows a user to print a report to reflect that a check is voided. Clerk check register selection criteria form 220 shown in FIG. 47 allows the users to produce a report for a given clerk by using the social security number as a selection criteria. Zip code selection criteria form 224 shown in FIG. 48 flags the user for zip codes embedded in the application. Form 224 will reflect those zip codes that are considered local for security verification. Print check copies selection criteria form 228 shown in FIG. 49 prints another copy of checks with a given batch number.

Figure 50:
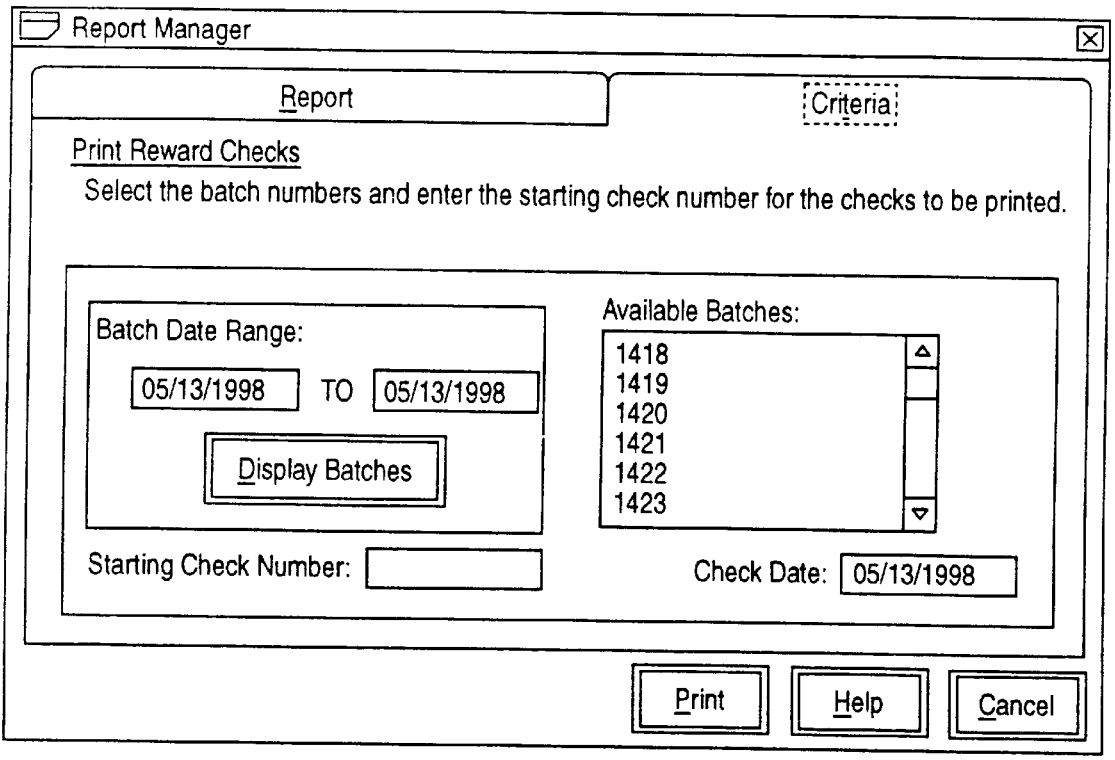
Figure 51:
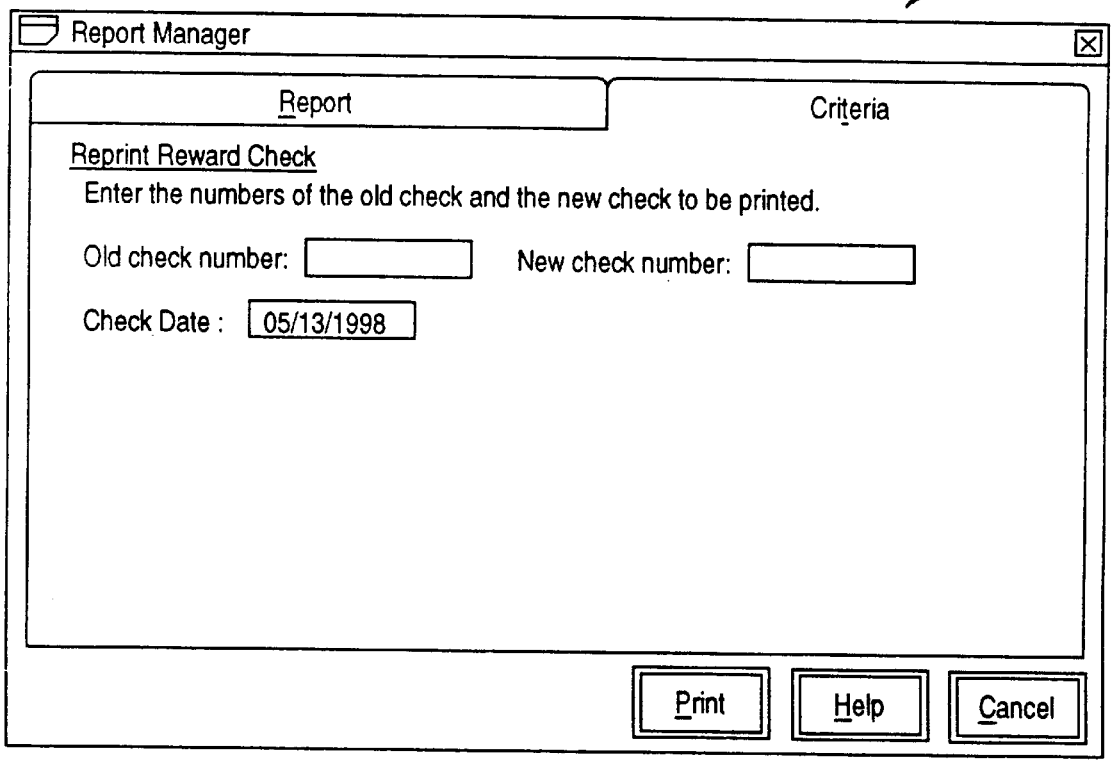
Figure 52:
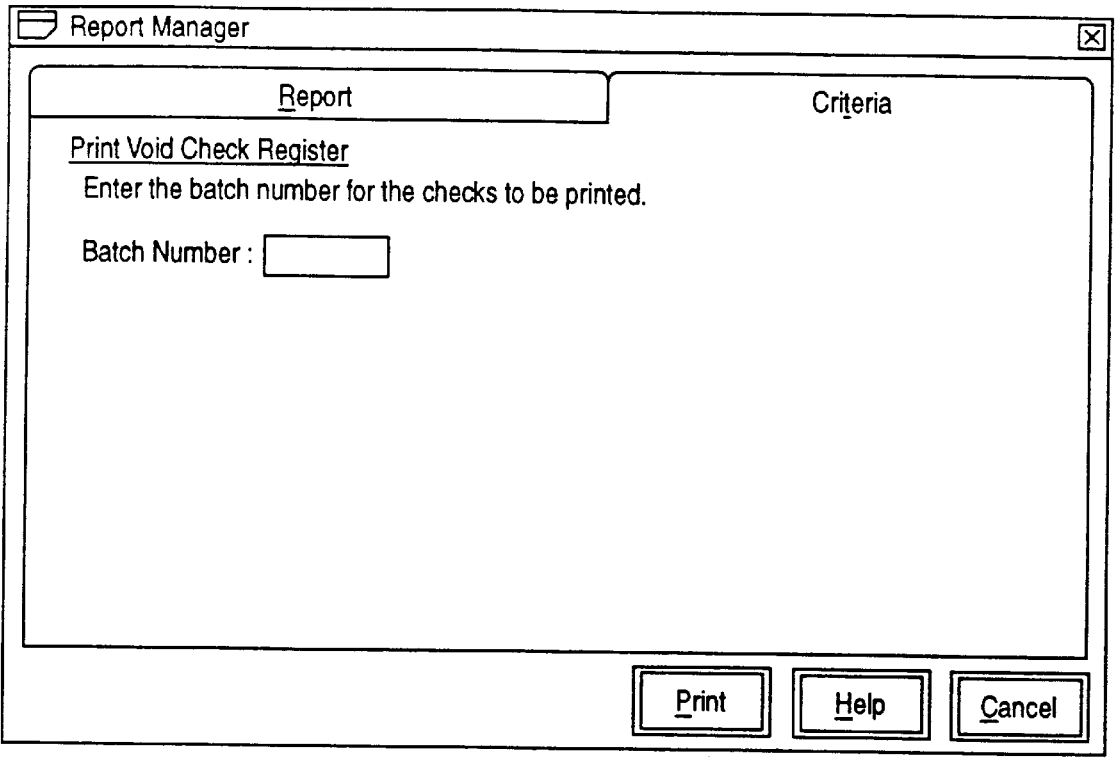

Print rewards selection criteria form 232 shown in FIG. 50 is where users are able to enter the selection for printing of checks. The users input the starting check number and select the batch to be printed. Reprint rewards check selection criteria form 236 shown in FIG. 51 allows a user to enter information to reprint a check. Void rewards checks selection criteria form 240 shown in FIG. 52 allows a user to print a report to reflect that checks are voided.

Figure 53:
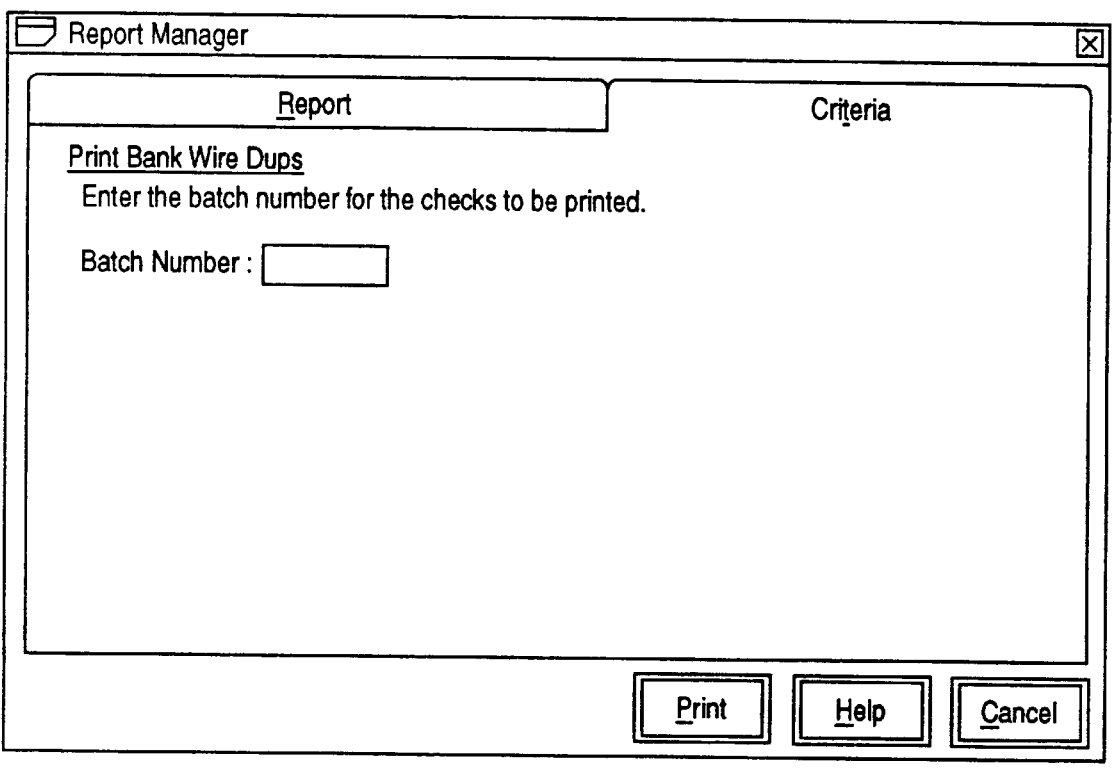
Figure 54:
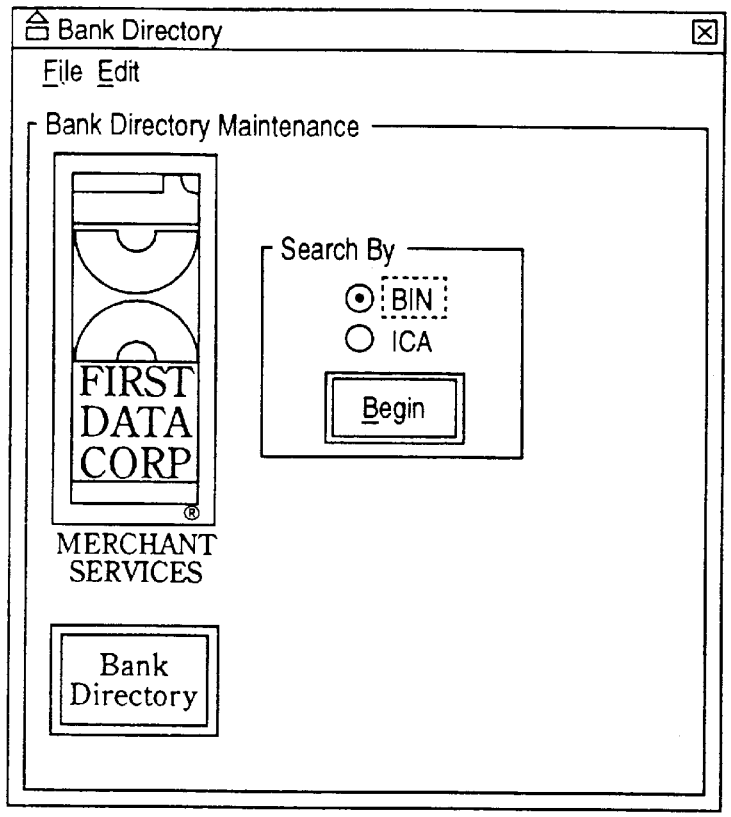

Bank wire dups selection criteria form shown in FIG. 53 produces a report to allow a user to determine if the bank wire processing has duplicate transactions. Bank directory maintenance main form 248 shown in FIG. 54 allows a user to search for bank information by either selecting the bank identification number (BIN) or the interbank card association number (ICA). The BIN and the ICA identify the bank to the processor.

Figure 55:
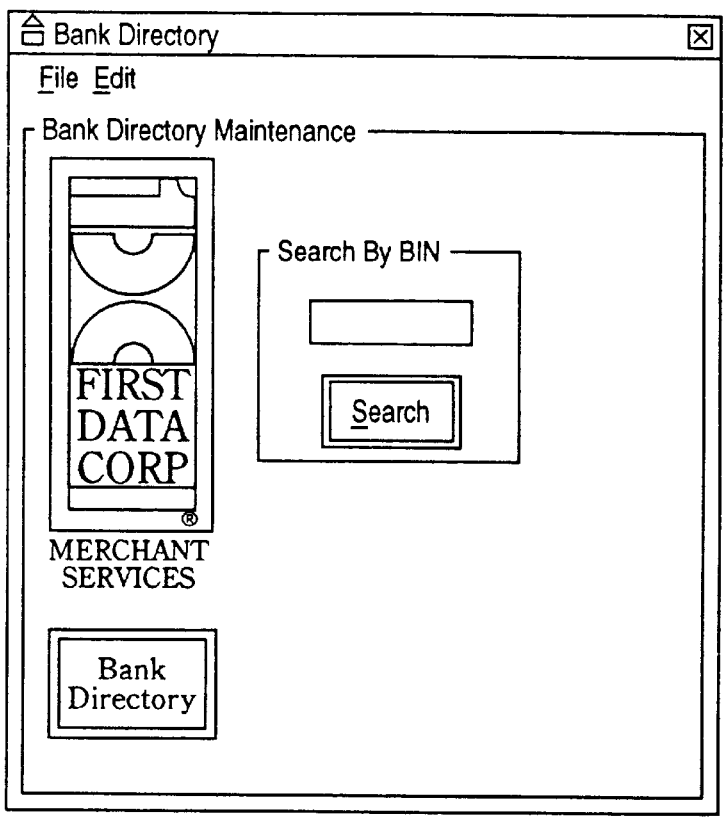
Figure 56:
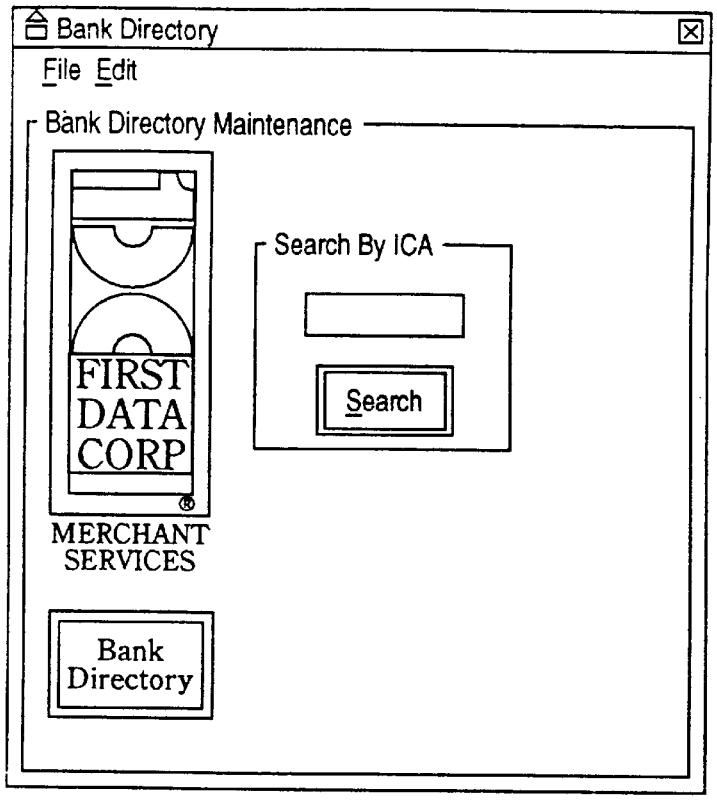
Figure 57:
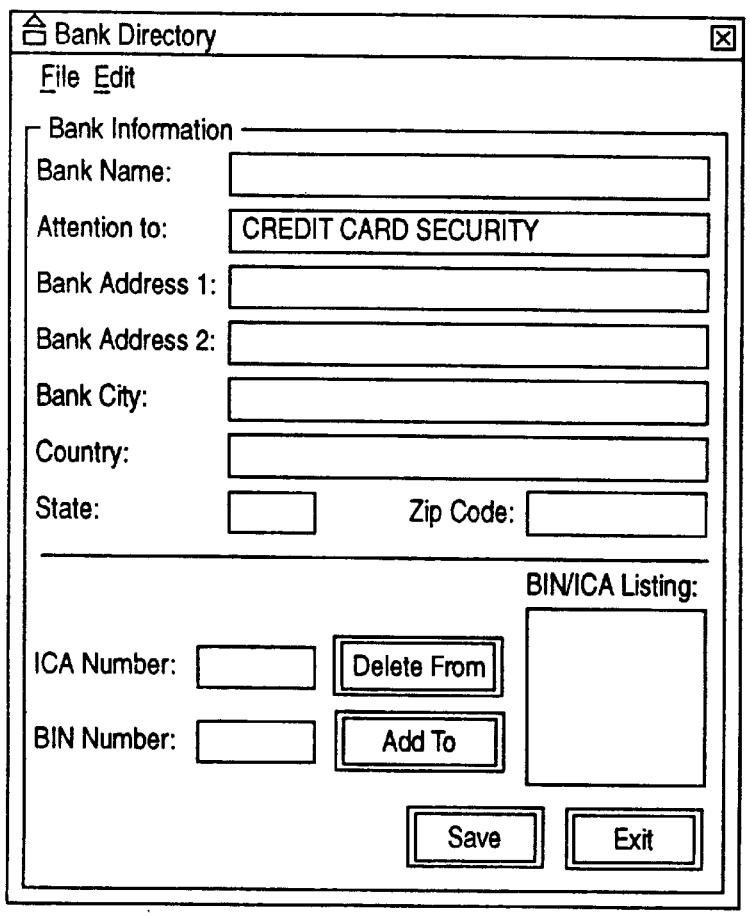

Bank directory maintenance search by BIN form shown in FIG. 55 allows a user to enter a BIN number and review the mailing information of a bank. Bank directory maintenance search by ICA form shown in FIG. 56 allows a user to enter an ICA number and review the mailing information of the bank. Bank directory maintenance mailing information form 260 is where the user's inquiry will be returned populating the fields with the bank's mailing information.

Thus it is apparent that there has been provided, in accordance with the present invention, a method of reporting suspense transaction detail to acquiring banks that fully satisfies the objects, aims, and advantages set forth above.

While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of reporting suspense transaction detail to acquiring banks, the method comprising:

compiling financial transaction information from different core systems to a mainframe, the different core systems including an automated clearing house core system, a chargeback core system, a funding core system, a paperless transaction service core system, and a rewards core system;

routing the financial transaction information from the mainframe to a database residing on a server operable with the World Wide Web;

receiving a request for a report of the financial information transaction at the server from a client station operable with the server via the World Wide Web;

executing queries associated with the requested report on the financial transaction information stored in the database to generate the requested report; and accessing the requested report of the financial transaction information from the server at the client station operable with the server via the World Wide Web.

\* \* \* \* \*